(12) United States Patent
Jeon et al.

(10) Patent No.: US 10,046,807 B2
(45) Date of Patent: Aug. 14, 2018

(54) HOOD PANEL FOR VEHICLE

(71) Applicant: Hyundai Motor Company, Seoul (KR)

(72) Inventors: Kyu Nam Jeon, Hwaseong-Si (KR); Jeong Min Cho, Suwon-Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/286,863

(22) Filed: Oct. 6, 2016

(65) Prior Publication Data

US 2017/0297629 A1 Oct. 19, 2017

(30) Foreign Application Priority Data

Apr. 14, 2016 (KR) .................. 10-2016-0045776

(51) Int. Cl.
  *B62D 25/12* (2006.01)
  *B62D 29/04* (2006.01)
  *B62D 25/10* (2006.01)
  *B60R 21/34* (2011.01)

(52) U.S. Cl.
  CPC .............. *B62D 25/12* (2013.01); *B60R 21/34* (2013.01); *B62D 25/105* (2013.01); *B62D 29/043* (2013.01); *B60R 2021/343* (2013.01)

(58) Field of Classification Search
  CPC .... B62D 25/12; B62D 29/043; B62D 25/103; B60R 21/34; B60R 2021/343

USPC ..................................... 296/193.11
  See application file for complete search history.

(56) References Cited

U.S. PATENT DOCUMENTS

| | | | | |
|---|---|---|---|---|
| 8,075,048 B2 * | 12/2011 | Kimoto | ................... | B60R 21/34 180/274 |
| 2009/0026807 A1 * | 1/2009 | Wang | ..................... | B60R 21/34 296/193.11 |

FOREIGN PATENT DOCUMENTS

| JP | 2008-302749 A | 12/2008 |
|---|---|---|
| JP | 2011-020614 A | 2/2011 |
| KR | 10-1997-0058742 | 12/1998 |
| KR | 10-2005-0068684 | 7/2005 |
| KR | 10-2006-0067228 | 6/2006 |
| KR | 10-2009-0073081 A | 7/2009 |

* cited by examiner

*Primary Examiner* — Joseph D. Pape
*Assistant Examiner* — Dana D Ivey
(74) *Attorney, Agent, or Firm* — Mintz Levin Cohn Ferris Glovsky and Popeo, P.C.; Peter F. Corless (57) ABSTRACT

A hood panel is provided. The hood panel includes a plurality of first layers formed of a reinforced fiber and a resin and a plurality of second layers including a complex portion formed of a reinforced fiber and a resin and a resin portion formed of a resin. The first layer and the second layers form a multilayer structure. A reinforced area is formed by the first layers and the complex portions of the second layers and a shock absorption area is formed by the first layers and the resin portions of the second layers.

7 Claims, 9 Drawing Sheets

HOOD PANEL FOR VEHICLE

CROSS-REFERENCE TO RELATED APPLICATION

This application claims the priority benefit of Korean Patent Application No. 10-2016-0045776, filed on Apr. 14, 2016 in the Korean Intellectual Property Office, the disclosure of which is incorporated herein by reference.

BACKGROUND

1. Field of the Invention

The present invention relates to a hood panel for a vehicle having a laminated dual structure, and more particularly, to a hood panel that absorbs impact during a collision with pedestrian by a reduction in the rigidity of the hood panel, and at the same time satisfying rigidity of the hood panel.

2. Description of the Related Art

Recently, research efforts evaluated a hood panels adjusted to have a variety of different thickness or different shapes to improve pedestrian safety during a collision between a vehicle and a pedestrian. For example, a hood panel formed of fiber-reinforced plastic, has a structure that provides for a thickness of a component, which may collide with the pedestrian, to be greater than those of the other components. Accordingly, there are design limitations and adjustment of a design based on the vehicle type is difficult to implement.

The matters disclosed in this section are merely for enhancement of understanding of the invention and should not be taken as an acknowledgment or any form of suggestion that the matters form the related art already known to a person skilled in the art.

SUMMARY

The present invention provides a hood panel for a vehicle having a laminated dual structure and more particularly to a hood panel for absorbing impact from vehicle collision by reducing the rigidity of the hood panel, and at the same time satisfying the rigidity requirements of the hood panel.

In accordance with an exemplary embodiment of the present invention, a hood panel for a vehicle may include a plurality of first layers formed of a reinforced fiber and a resin and a plurality of second layers each comprising a complex portion formed of a reinforced fiber and a resin, and a resin portion formed of a resin. The first layers and second layers form a multilayer structure, a reinforced area is formed by the first layers and the complex portions of the second layers, and a shock absorption area may be formed by the first layers and the resin portions of the second layers.

The first layers and second layers may be alternately laminated to form the multilayer structure. The first layers may be disposed as an uppermost layer and a lowermost layer in the multilayer structure. The first layers and the complex portions of the second layers may be each formed of reinforced fibers unidirectionally oriented. The orientation angles of the reinforced fibers in respective layers may be varied.

The reinforced fibers of the first layers and the complex portions may include carbon fibers and the resin portions may include reinforced fibers having strength less than the strength of carbon fibers. For example, when viewed from the top of the vehicle, the reinforced area may be formed at an edge portion of the multilayer structure and may include the first layers and the second layers. The shock absorption area may be formed at a central portion of the multilayer structure and may include the first layers and the second layers.

The reinforced area may further include a striker component formed at a front side of the multilayer structure having the first layers and the second layers. The striker component may include a striker. The reinforced area may further include hinge components formed opposite to each other (e.g., at opposite sides) in a rear side of the multilayer structure that may include the first layers and the second layers, the hinge components may have hinges configured to rotate the multilayer structure to open or close the multilayer structure. The reinforced area may further include gas lifter components formed at both sides of the striker component and in front of the hinge components. The gas lifer components may include gas lifters configured to lift the multilayer structure including the first layers and the second layers. The reinforced area further may further include a rear portion disposed between both hinge components.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

As illustrated in FIGS. 1 to 4, the hood panel for the vehicle according to the illustrated exemplary embodiment of the present invention may include a plurality of first layers 100 formed of a reinforced fiber and a resin and a plurality of second layers 200 that may each include a complex portion 210 formed of a reinforced fiber and a resin and a resin portion 220 formed of a resin. The first layers and second layers 100 and 200 may be alternately laminated to form a multilayer structure. A reinforced area 300 may be formed by the first layers 100 and the complex portions 210 of the second layers 200. A shock abortion area 400 may be formed by the first layers 100 and the resin portions 220 of the second layers 200. Each first layer 100 may be formed of a composite material and may have a substantially uniform thickness and a shape that corresponds to a shape of the hood panel. The composite material may be formed of a resin and a reinforced fiber impregnated with the resin.

Figure 1:
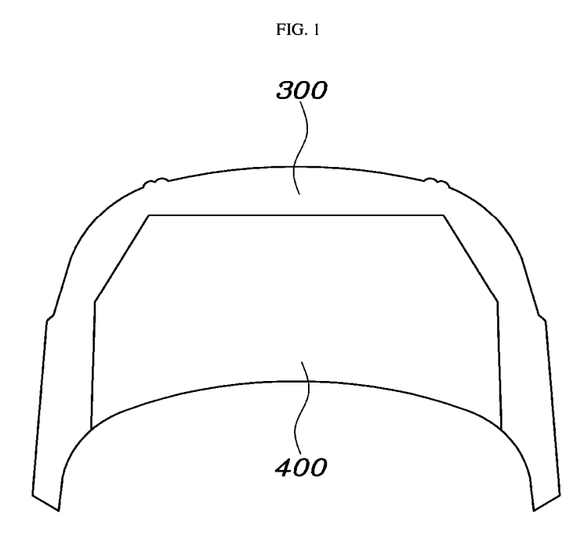
FIG. 1 is an exemplary plan view illustrating a hood panel for a vehicle from a top view according to an exemplary embodiment of the present invention.
Figure 2:
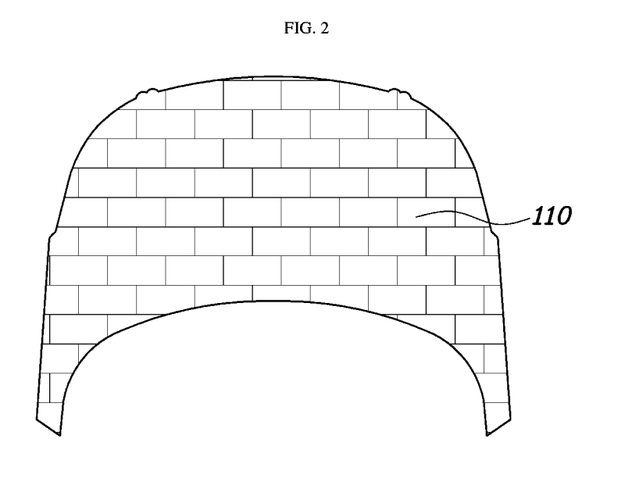
FIG. 2 is an exemplary view illustrating a preform or prepreg of a first layer according to the illustrated exemplary embodiment of the present invention.

As illustrated in FIG. 2, the reinforced fiber of each first layer 100 may have the form of a preform or prepreg 110 with a shape that corresponds to the shape of the hood panel. For example, similar to the first layers 100, each second layer 200 may have a substantially uniform thickness and a shape that corresponds to the hood panel shape. The complex portion 210 may be included in each second layer 200 and may be formed of a resin and a reinforced fiber impregnated with the resin similar to each first layer 100. Additionally, the resin portion 220 that may be included in each second layer 200 may be formed of a resin. As shown FIG. 3, the reinforced fiber of each second layer 200 may have the form of a preform or prepreg 211 with a shape that corresponds to a shape of the complex portion 210. The resin portions 220 included in respective second layers 200 may be formed at corresponding portions, respectively. Carbon fiber, glass fiber or aramid fiber may be used as the reinforced fiber. Thermoplastic resin or thermosetting resin may be used as the resin, but may be not limited thereto.

Figure 3:
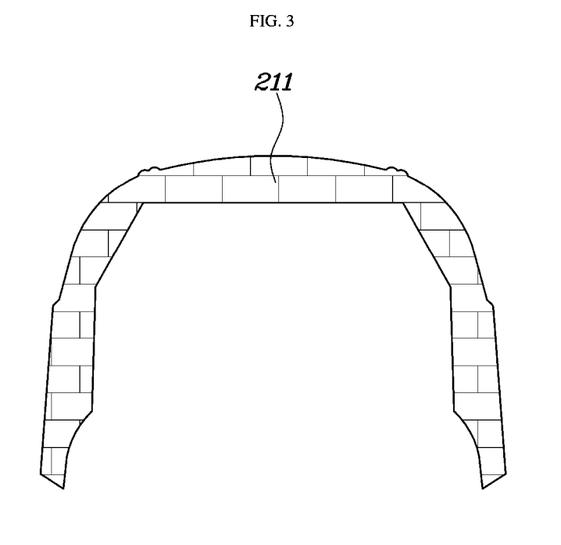
FIG. 3 is an exemplary view illustrating a preform or prepreg of a second layer according to the illustrated exemplary embodiment of the present invention.

In particular, when the preforms or prepregs 110 of the first layers 100 and the preforms or prepregs 211 of the complex portions 210 of the second layers 200 are laminated alternately, to be oriented in one direction, the reinforced fibers in the preforms or prepregs 110 and 211 may be unidirectional (e.g., UD). For example, the orientation angles of the reinforced fibers in respective layers may be varied to be about 0°, 90°, +45°, −45°, −45°, +45°, 90°, 0°. As a result, strength and rigidity of the hood panel may be enhanced. Accordingly, a load may be transferred in various directions upon collision. The first layers 100 and the complex portions 210 of the second layers 200 formed as described above, may include the multilayer structure to form the hood panel. Since the reinforced fibers are included in the complex portion 210 of the first and second layers 100 and 200 the area formed by the first layers 100 and the complex portions 210 may exhibit high strength and high rigidity and may provide a function as a rigidity securing area.

Furthermore, since a portion of each second layer 200, namely, the resin portion 220, may be formed of the resin, an area formed by the first layers 100 and the resin portions 220 may have a reduced strength and reduced rigidity compared to the reinforced area 300. Accordingly, the shock absorption area 400 may provide an area to absorb a shock to a pedestrian during a collision and may function as a cushion due to reduced strength and rigidity thereof, thereby securing pedestrian safety. In particular, the hood panel through design of each second layer 200, may include a predetermined area to provide rigidity and an area to absorb shock may be predetermined. Accordingly, the rigidity required to the hood panel may be satisfied while enhancing safety during a collusion. Furthermore, the hood panel for the vehicle may be formed to include the multilayer structure with the first layers 100 and the second layers 200 and structural or shape constraints in conventional hood panels for pedestrian protection may be avoided. Thus, a hood panel having increased degree of design freedom may be manufactured.

Figure 4:
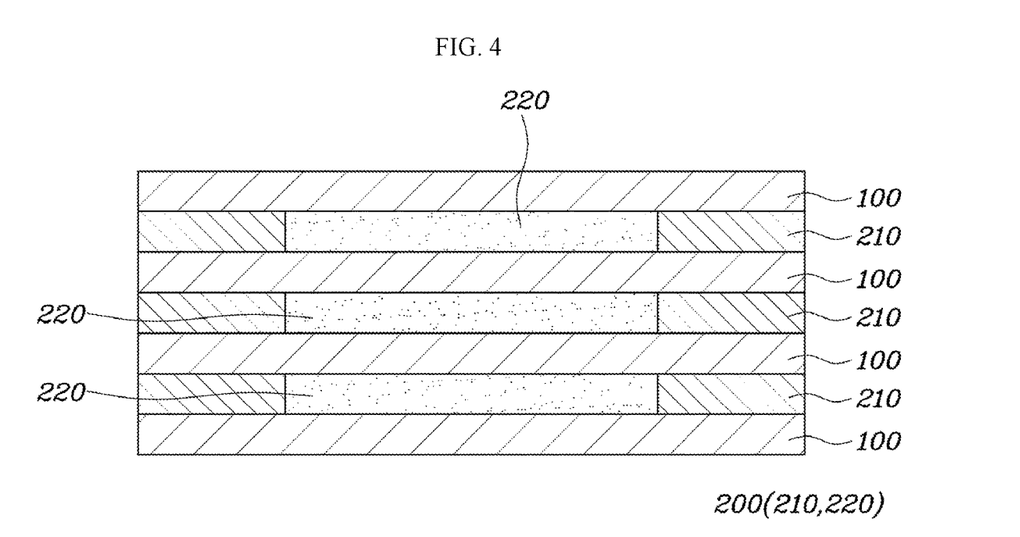
FIG. 4 is an exemplary sectional view illustrating the hood panel for the vehicle according to the illustrated exemplary embodiment of the present invention.

Furthermore, the hood panel for the vehicle according to the present invention, as shown FIG. 4, may include the first layers 100 and the second layers 200 that may be laminated alternately to form a multilayer structure. In other words, the first layers 100 may include layers respectively disposed as an uppermost layer and a lowermost layer in the multilayer structure. The first layers 100 and the second layers 200 may be laminated alternately to form a layered structure. Namely, one second layer 200 may be disposed between the adjacent first layers 100. Accordingly, the resin portions 220 of the first layers 100 may be induced to gradually fracture upon collision with a pedestrian. An effective cushion function may be performed due a gradual fracture, thereby further improving vehicle performance during a collision. Simultaneously, since the first layers 100 may be formed of the composite material the reinforced fibers may be arranged at the uppermost and lowermost layers of the hood panel, respectively, and rigidity may be improved.

In the hood panel for the vehicle according to the present invention, the reinforced fibers of the first layers 100 and the complex portions 210 may include carbon fibers. Further, the resin portions 220 may include a reinforced fiber with a strength than is less than the strength of the carbon fibers. When carbon fibers are used as the reinforced fibers, strength and rigidity of the hood panel may be improved and a weight of the vehicle body may be reduced to improve fuel efficiency of the vehicle. The preform or prepreg 110 of each first layer 100 and the preform or prepreg 211 of each complex portion 210 of the second layers 200 may be formed from a fabric or a non-crimp fabric rather than a UD form. In particular, to satisfy basic rigidity of the hood panel, the resin portion 220 of each first layer 100 may include reinforced fibers with a strength that is less than the strength of the carbon fibers. For example, glass fibers may be used as the reinforced fibers and may have a lower strength than the strength of the carbon fibers.

According to the hood panel according to the present invention, when viewed from the top, the reinforced area 300 may be formed at an edge portion of the multilayer structure including the first layers 100 and the second layers 200. The shock absorption area 400 may be formed at a central portion of the multilayer structure and may include the first layers 100 and the second layers 200. To secure rigidity of the hood panel the reinforced area 300 may be formed at an edge portion of the hood panel. Furthermore, since various components may be mounted at the edge portion of the hood panel, the edge portion of the hood panel may secure the rigidity of the hood panel.

Figure 5:
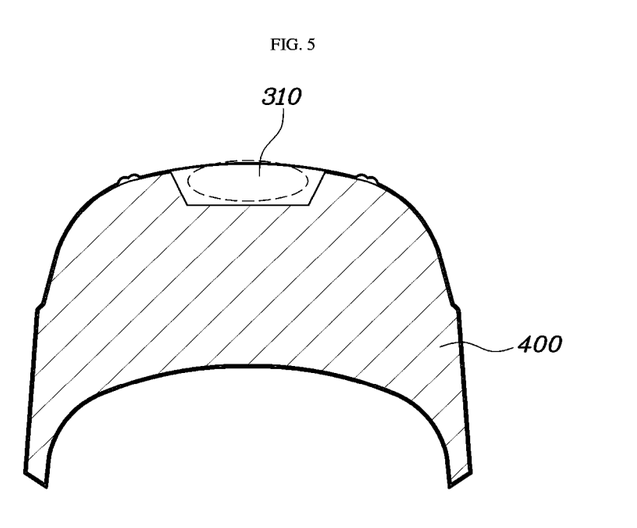
FIG. 5 is an exemplary plan view illustrating a hood panel for a vehicle including a reinforced area formed at a striker component when viewed from the top according to an exemplary embodiment of the present invention.

According to an exemplary embodiment of the present invention, as illustrated in FIG. 5, the reinforced area 300 may include a striker component 310 formed at a front side of the multilayer structure that may include the first layers 100 and the second layers 200 with a striker. The striker may be configured to engage a latch formed at the vehicle body when the hood panel is closed after being opened. The striker may be mounted at a bottom surface of the front side of the hood panel. A load may be concentrated on the striker and the striker component 310 may provide a rigidity that corresponds to the load.

Figure 6:
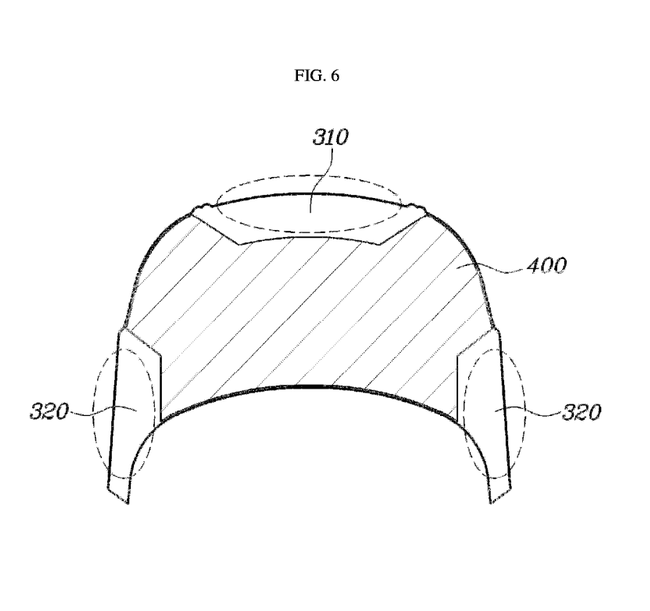
FIG. 6 is an exemplary plan view illustrating a hood panel for a vehicle including reinforced areas formed at a striker component and hinge components when viewed from the top according to an exemplary embodiment of the present invention.

Additionally, as illustrated in FIG. 6, the reinforced area 300 may further include hinge components 320 formed at opposite sides in a rear side of the multilayer structure that may include the first layers 100 and the second layers 200 while having hinges. Each hinge may be configured to pivot the multilayer structure to open or close the multilayer structure. The hinge may be a component configured to pivot the hood panel when mounted to a vehicle body. Generally, the hinges may be mounted at bottom surfaces of opposite sides in the rear side of the hood panel. In other words, the hood panel may be configured to pivot about the hinges and a load may be concentrated on the hinges. Accordingly, the hinge components 320 equipped with the hinges may provide rigidity. In particular, the striker component 310 and hinge components 320 may be included in the reinforced area 300. Generally, the exemplary embodiment of such a configuration may be applied to a vehicle without a gas lifter.

Figure 7:
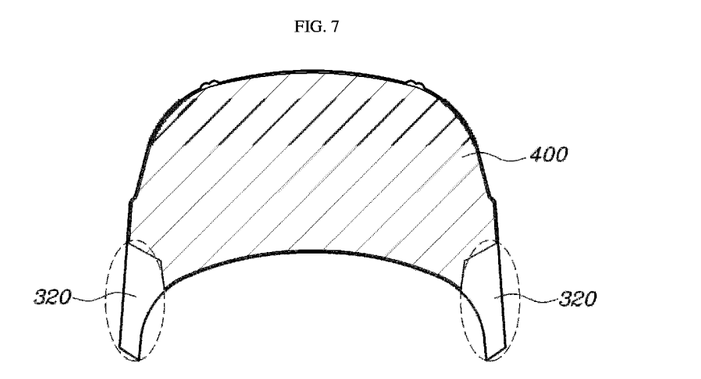
FIG. 7 is an exemplary plan view illustrating a hood panel for a vehicle including reinforced areas formed at hinge components when viewed from the top according to an exemplary embodiment of the present invention.

Furthermore, as illustrated in FIG. 7, the hinge components 320 equipped with the hinges may be included in the reinforced area 300 to secure rigidity. Accordingly, the shock absorption area 400 may have a maximum size. In other words, the hood panel may include a structure capable of maximizing performance of vehicle during a collision.

Figure 8:
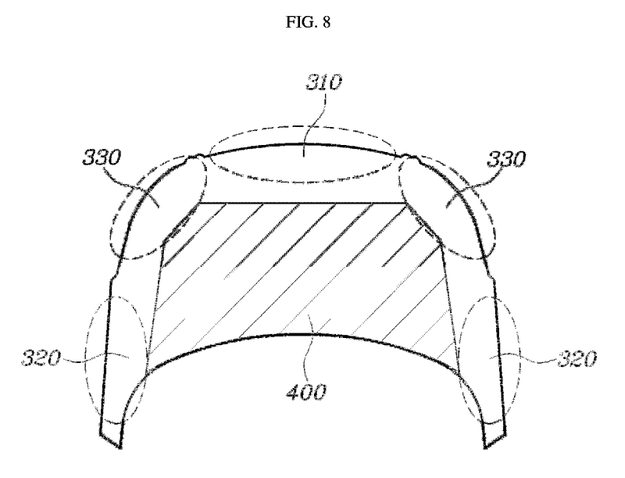
FIG. 8 is an exemplary plan view illustrating a hood panel for a vehicle including reinforced areas formed at a striker component, hinge components and gas lifter components when viewed from the top according to an exemplary embodiment of the present invention.

As illustrated in FIG. 8, the reinforced area 300 may further include gas lifter components 330 that may be formed at both sides of the striker component 310 in front of the hinge components 320 and may be equipped with gas lifters configured to lift the multilayer structure including the first layers 100 and the second layers 200. Each gas lifter may include a component for lifting the hood panel using gas. The gas lifter components 330 may be mounted in front of the two hinge components 320 in the hood panel and may be configured to pivot about hinges to support pivotal movement of the hood panel. In particular, a load may be concentrated on the gas lifters similar to the hinge components 320. Accordingly, the gas lifter components 330 may further be included in the reinforced area 300 to secure rigidity.

Figure 9:
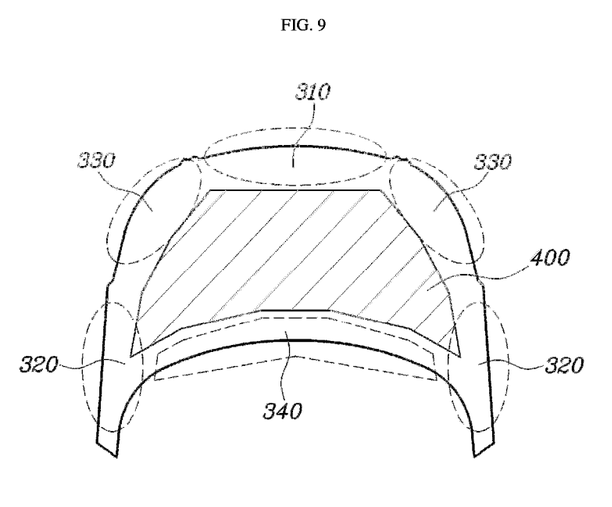
FIG. 9 is an exemplary plan view illustrating a hood panel for a vehicle including reinforced areas formed at a striker component, hinge components, gas lifter components and a rear component when viewed from the top according to an exemplary embodiment of the present invention.

As illustrated in FIG. 9, the reinforced area 300 may further include a rear portion 340 disposed between the two hinge components 320. The rear portion 340 may include the edge portion of the hood panel adjacent to a windshield glass of the vehicle. The reinforced area 300 may include the rear portion 340. Accordingly, rigidity of the rear portion 340 may be secured when a load is concentrated on the rear portion 340 by a counterpart component of the vehicle. Namely, the reinforced area 300 may be formed at the edge portion of the hood panel to provide reinforced rigidity. The shock absorption area 400 may be formed at the central portion to enhance vehicle performance. As apparent from the above description, in accordance with the present invention, a hood panel of a vehicle having a laminated dual structure may absorb impact from collision by locally reducing the rigidity of the hood panel and at the same time satisfying the structural integrity rigidity requirements of the hood panel.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A hood panel for a vehicle, comprising:
   a plurality of first layers formed of a reinforced fiber and a resin; and
   a plurality of second layers each having a complex portion formed of a reinforced fiber and a resin, and a resin portion formed of a resin,
   wherein: the first layers and second layers form a multilayer structure;
   a reinforced area formed by the first layers and the complex portions of the second layers; and
   a shock absorption area formed by the first layers and the resin portions of the second layers,
   wherein the first layers and second layers are laminated alternately to form the multilayer structure,
   wherein the first layer and the complex portion of the second layers are each formed of reinforced fibers unidirectionally oriented, and the orientation angles of the reinforced fibers in respective layers are varied,
   wherein when viewed from the top of the vehicle, the reinforced area is formed at an edge portion of the multilayer structure including the first layers and the second layers, and the shock absorption area is formed at a central portion of the multilayer structure including the first layers and the second layers.

2. The hood panel according to claim 1, wherein the first layers are disposed as an uppermost layer and a lowermost layer in the multilayer structure.

3. The hood panel according to claim 1, wherein the reinforced fibers of the first layers and the complex portions include carbon fibers, and the resin portions include reinforced fibers having a strength less than strength of carbon fibers.

4. The hood panel according to claim 1, wherein the reinforced area further includes a striker component formed at a front side of the multilayer structure including the first layers and the second layers, the striker component having a striker.

5. The hood panel according to claim 4, wherein the reinforced area further includes hinge components formed at opposite sides in a rear side of the multilayer structure including the first layers and the second layers, the hinge components having hinges are configured to pivot the multilayer structure, to open or close the multilayer structure.

6. The hood panel according to claim 5, wherein the reinforced area includes gas lifter components formed at both sides of the striker component and in front of the hinge components, the gas lifer components having gas lifters for lifting the multilayer structure including the first layers and the second layers.

7. The hood panel according to claim 6, wherein the reinforced area further includes a rear component between both hinge components.

* * * * *